No. 819,563. PATENTED MAY 1, 1906.
J. B. LINN.
ELECTRIC MOTOR CONTROLLER.
APPLICATION FILED MAR. 1, 1902.

3 SHEETS—SHEET 1.

Witnesses
Marcus B. Byng.
Helen Orford.

Inventor:
John B. Linn,
by Albert G. Davis
Att'y.

No. 819,563. PATENTED MAY 1, 1906.
J. B. LINN.
ELECTRIC MOTOR CONTROLLER.
APPLICATION FILED MAR. 1, 1902.

3 SHEETS—SHEET 3.

Witnesses:
Marcus H. Byng.
Helen Orford.

Inventor:
John B. Linn,
by Albert B. Davis
Att'y.

UNITED STATES PATENT OFFICE.

JOHN BRANDON LINN, OF SCHENECTADY, NEW YORK, ASSIGNOR TO GENERAL ELECTRIC COMPANY, A CORPORATION OF NEW YORK.

ELECTRIC-MOTOR CONTROLLER.

No. 819,563.	Specification of Letters Patent.	Patented May 1, 1906.

Application filed March 1, 1902. Serial No. 96,211.

*To all whom it may concern:*

Be it known that I, JOHN BRANDON LINN, a citizen of the United States, residing at Schenectady, county of Schenectady, State of New York, have invented certain new and useful Improvements in Electric-Motor Controllers, of which the following is a specification.

This invention relates to controllers for electric motors; and its object is to render such apparatus more compact, cheaper in cost of manufacture, and the parts thereof readily accessible and replaceable.

It is a further object of the invention to provide a novel arrangement of contacts, as will appear from the following description, claims, and accompanying drawings.

I have chosen to illustrate my invention as applied to a controller for regulating Y-connected three-phase induction-motors in which the regulation is effected by alternately connecting the supply-conductors to the free ends of the windings and to the middle points of the windings, the free ends in the latter case being connected together. Applied to a properly-wound motor this arrangement operates to change the number of poles which for well-known reasons causes a change in speed. The scheme of winding I have referred to will be explained later in order that application of my invention may be made clear; but it is to be understood that the winding itself is not my invention, and I do not claim it.

Figure 1:
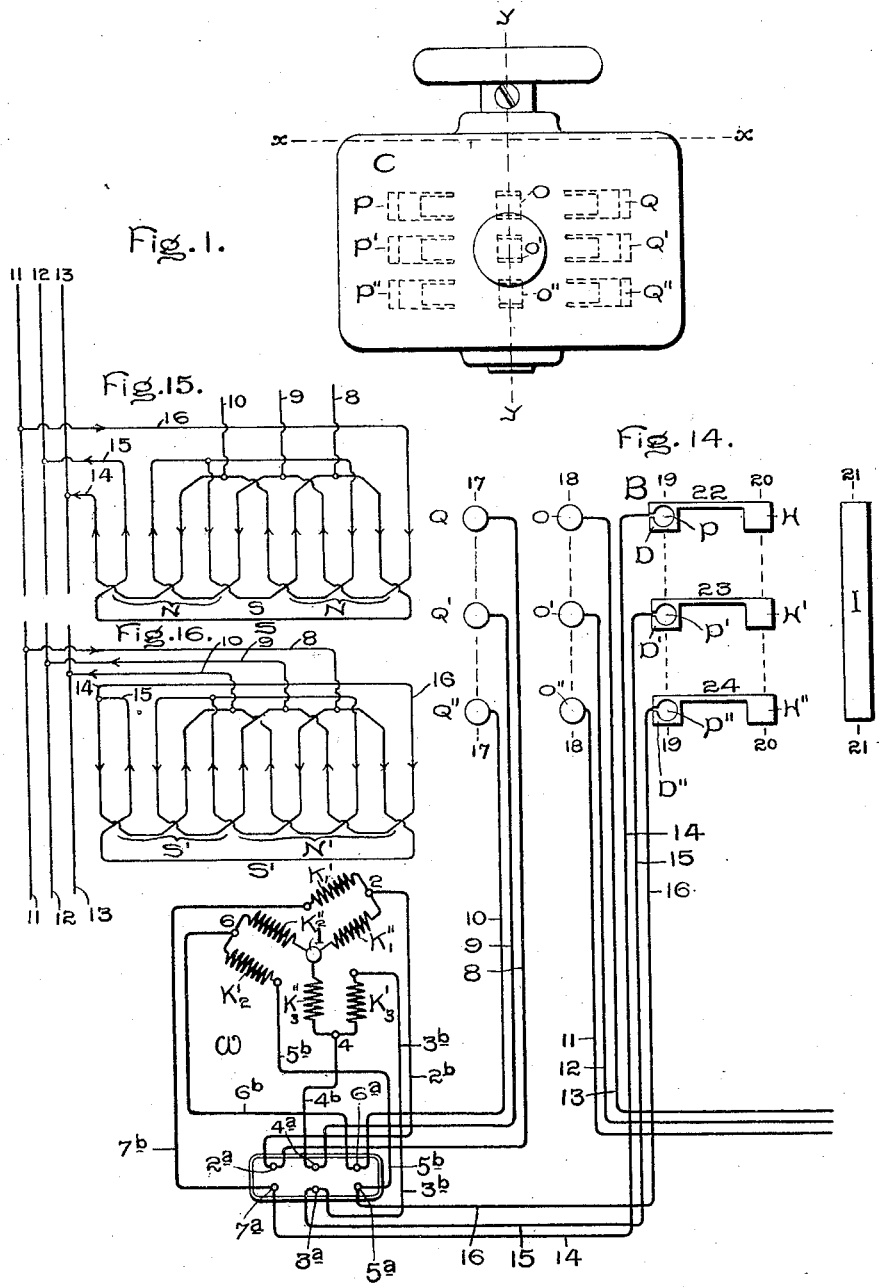
Figure 2:
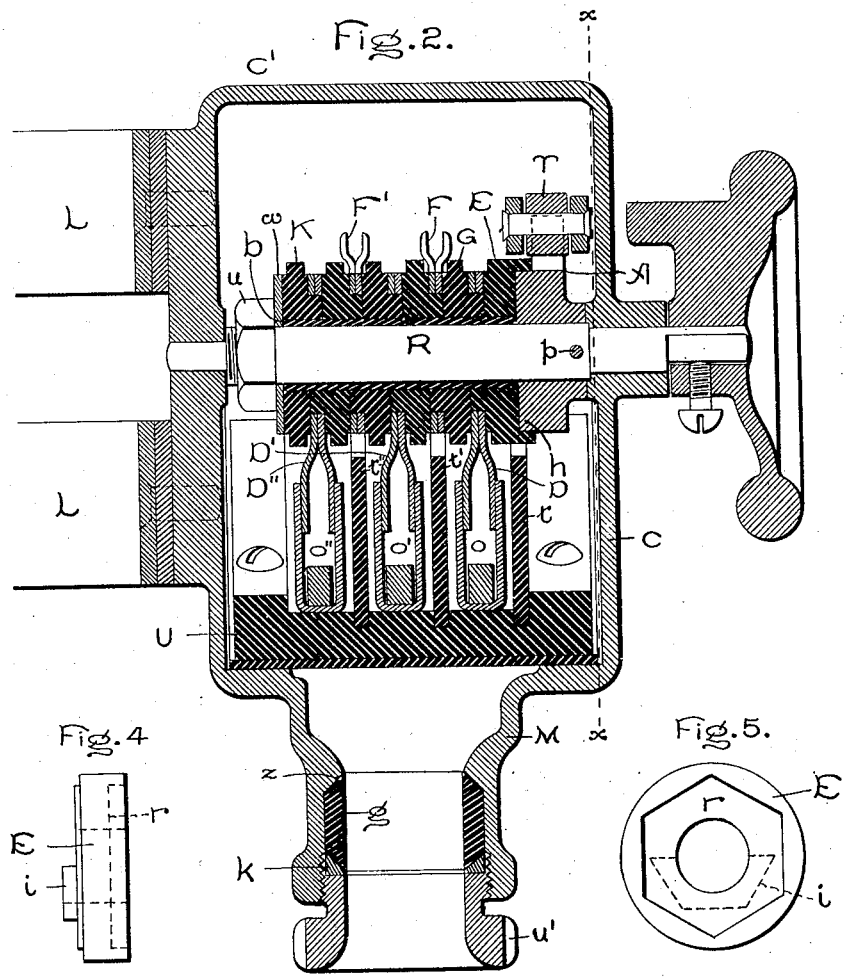
Figure 3:
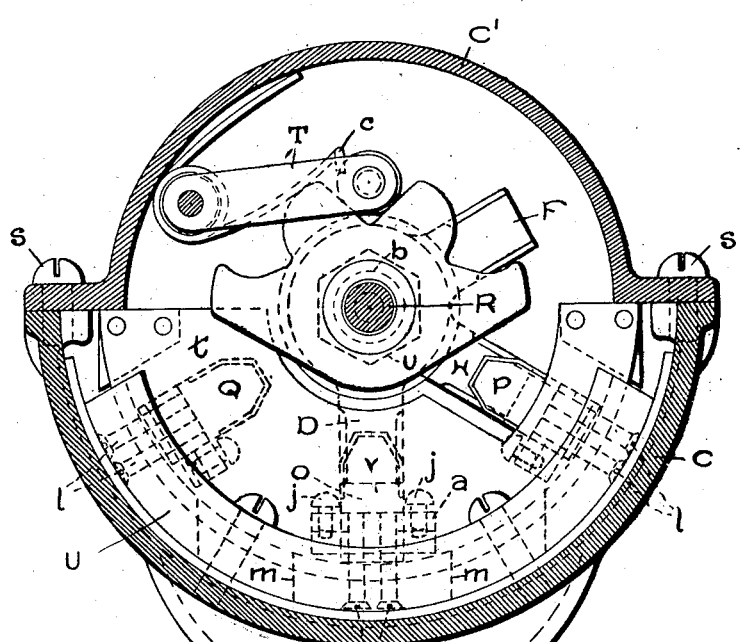

Referring to the accompanying drawings, Figure 1 is an external view of a controller embodying my invention. Fig. 2 is a section, on an enlarged scale, on line $y\ y$ of Fig. 1. Fig. 3 is a section on line $x\ x$ of Figs. 1 and 2, drawn to the same scale as Fig. 2. Figs. 4, 5, 6, 7, 8, 9, 10, 11, 12, and 13 are detail views of parts, Figs. 4, 5, 8, 10, and 11 being views of the same objects as shown in Figs. 4, 7, 9, 11, and 13, respectively, but at right angles to the views there shown. Fig. 14 is a diagrammatic illustration of my controller and the motor-windings and connections wherein the contacts of the controller are considered as developed upon a plane surface, the circles indicating stationary and the rectangles movable contacts. Figs. 15 and 16 are diagrams showing a development on a plane surface of the motor-windings in detail, the two figures showing the windings and connections in the two operative positions of the controller. The relative directions of the currents in the windings are indicated by the arrow-heads.

Figure 12:
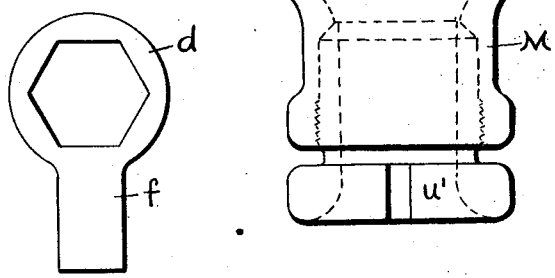
Figure 13:

Referring to Figs. 1, 2, and 3, C and C' are shells of semicircular section forming the controller-casing and coöperating to form bearings for shaft R. The shell C has a neck M, through which conductors enter the controller, and the two shells are secured together by screws $s$. The whole is arranged for attachment to a support, as L. Rigidly fixed to shaft R by pin $p$ is star-wheel A, having a hexagonal projection $h$. Adapted to engage with the notches of wheel A is detent T, which is held in engagement by spring $c$. Upon shaft R insulating-sleeve $b$ is placed, and upon this sleeve the contacts and insulation of the movable member are built up in the following manner:

The insulating-piece E, of vulcanite or other suitable material, which is shown in detail in Figs. 4 and 5, is placed upon the shaft so that its hexagonal recess $r$ receives the hexagonal projection from star-wheel A. From the opposite side of piece E extends a semihexagonal projection $i$. Two conducting-pieces, as shown in Figs. 10 and 11, having seat parts, as $d$, inclosing a hexagonal opening, and offset contacting portions $f$, projecting radially therefrom, are threaded upon shaft R in such manner that parts $d$ come into close contact with each other, while portions $f$ are directly opposite each other and separated, as will be seen by an inspection of contacts D, D', D'', F, and F' of Figs. 2 and 3. The hexagonal openings in the seat parts of the conducting-pieces are of such dimensions that a clearance is formed between the pieces and the shaft or the insulating-sleeve $b$, which surrounds the shaft. Into this clearance the projection $i$, extending from piece E, enters when the conducting-pieces are in position. An insulating-piece G, as shown in detail in Figs. 6 and 7, is then threaded upon the shaft. This piece has a projection on each side which is similar to projection $i$ from piece E, and when in position one of said projections coöperates with projection $i$ to form a hexagonal body, which entirely fills the clearance within the conducting-pieces and forms a locking-seat for those pieces—that is, relative movement between the pieces and their insulating-seat is prevented—and this by the coöperating forms of the conducting-pieces and their seats without the aid of any auxiliary securing devices, as pins, keys, &c. Piece G being in position, two conducting-pieces, as shown in Figs. 12 and 13, are threaded on the shaft. These pieces are similar to that shown in Figs. 10 and 11, except that each of the pieces in question has one radial projection instead of two and are secured in position in a manner precisely similar to that described in connection with the preceding pair of conducting-pieces. This process of building up by alternating pairs of conducting-pieces with insulating-pieces, as G, is continued, and the pairs of conducting-pieces are formed alternately of pieces having one and two radial projections until there are three pairs forming two contacts and two pairs forming one contact each, care being taken throughout that the contacts bear proper angular relations to each other. This relation will be readily understood from the description in connection with Fig. 14, which will shortly follow. The required contacts being in place, an insulating-piece K, as shown in Figs. 8 and 9, is threaded upon shaft R. This piece is similar to piece G, (shown in Figs. 6 and 7,) except that it has the semihexagonal projection upon one side only, the other side being plane. It is so placed upon the shaft that its projection fills the clearance within the last pair of contact-pieces. Against its plane face is forced washer w, by means of nut u turning upon a thread on shaft R, and the whole structure is thus bound firmly together. While the contacts, as stated, are required in the controller used in illustration, it is evident that an indefinite number of contacts may be formed by continuing the building up as described. The number of contacts per pair of conducting-pieces may be made any that is desired by providing conducting-pieces having the requisite number of radial projections, and the contacts may be arranged to have any desired angular relations.

The conducting-pieces may be stamped from sheet metal and the insulating-pieces molded, thus securing a low cost of production, and it is to be noted that the locking-seat is not necessarily of the form of a hexagon or even of any polygon. It may, on the contrary, be of any suitable form, the opening in the conducting-pieces in each case corresponding in form to that decided upon for their seats.

The most convenient location for the stationary contacts is upon that side of the controller where the entrance for the conductors is situated. I therefore bridge this entrance with an insulating-shell U, which conforms to the controller-casing and is secured thereto by screws or other convenient means. Apertures m in shell U permit the entrance of the conductors to the interior of the controller. Mounted upon the insulating-shell are the stationary contacts O--O″, P--P″, and Q--Q″, Figs. 1, 2, and 3, which are precisely similar and are, referring to contact O by way of illustration, constructed of a U-shaped piece v, inclosing a block a, of conducting material, to which the conductors may be secured by screws j, and the whole is secured to shell U by screws l, which pass through piece v and enter block a.

In order that the interior of the controller may be as secure as possible against exterior communication and to provide additional insulation for the conductors and also to take up some of the strain upon the conductors which otherwise would fall upon the contacts to which they were connected, I place within the neck a pliable insulating-sleeve g, having inclined end faces. Within the neck and adapted to bear against one inclined end of the sleeve is an inclined shoulder z. The other end of the sleeve bears against a similarly-inclined face of a washer k, and against the opposite face of said washer bears nut u'. The conductors being threaded through nut u, sleeve g, and washer k and fastened to their respective contacts, the nut may be forced against the washer by means of a wrench, when sleeve g will be forced toward the center of the neck and against the conductors.

Inspection of Figs. 1, 2, 3, and 14 will show that both the stationary and movable contacts are arranged in rows parallel to the axis of the movable portion, and the three steps of the controller I have shown correspond to the three notches of the star-wheel. In the off position the detent would be in engagement with the right-hand notch, Fig. 3, and movable contact D would be in engagement with stationary contact P. Similarly the movable contacts of the row containing D would be in engagement with stationary contacts in which P is situated. In the next position of the controller, as shown in Fig. 3, the row of movable contacts containing D move into contact with the row of stationary contacts containing O, and the row of movable contacts containing contact H move into engagement with the stationary row containing contact P. It has been seen that the contacts D and H are connected and other contacts of the rows in which they lie are similarly connected. The stationary contacts O and P are therefore electrically connected, and the corresponding contacts of the two rows containing them are connected in a similar manner. The manner in which the movable and stationary contacts have up to this time been in engagement will be seen by reference to Fig. 2, where it will be noticed that the separated ends of a movable contact enter between the upright portions of a stationary contact and are held against each other by virtue of the lateral resilience of the contacts themselves. In the succeeding and last position contacts of the rows containing D and H will engage with the contacts of rows containing Q and O, respectively, thereby connecting corresponding contacts of those rows in a manner as already described with reference to the rows containing O and P. Contact F comes in contact with P and also with the adjacent contact in the row with P. Other contacts in the row with F connect together the adjacent sides of the different contacts, so that all those in the row with P are connected together. The method of making contact between rows containing F and P differs from that in the other cases, in that each movable contact is entered between the upright pieces of adjacent stationary contacts instead of between the upright pieces of one contact. This will be readily understood if we consider contact F in Fig. 2 as moved until it is in contact with the adjacent upright pieces of contacts O and O'. It may seem that with the dimensions shown the insulating-partitions $t$, $t'$, and $t''$ are in the way of contacts F and F'; but it is to be noticed that this is avoided by partially cutting away the partitions, as shown at the right of Fig. 3. This is sufficient in the case illustrated, as the movable contacts in question do not move beyond the first row of stationary contacts. Referring to Figs. 14, 15, and 16, B represents the controller and W the motor-windings. Contacts F and F', which act to connect the contacts of a row together, are represented in the diagram by rectangle I, which illustrates the performance of the same function. The rows of movable contacts D D' and H H' are connected together by conductors 22, 23, and 24. B is represented as in the off position, and the contacts D D' D'' are in engagement with contacts P P' P'' on line 19 19. In the next or first operative position contacts D D' D'' come into engagement with stationary contacts on line 18 18, and the movable contacts previously on lines 20 20 and 21 21 move until they lie along lines 19 19 and 20 20, respectively. Circuits can now be traced from supply-conductors 11 to contact O'', thence through contact D'', conductor 24, contact H'', contact P'', conductor 16 to terminal of motor $5^a$, thence through lead $5^b$, winding $K'_2$ to junction 6, thence through winding $K''_2$ to junction 1. In a similar way circuit may be traced from supply-conductor 12 through contact O', contact D', conductor 23, contact H', contact P', and conductor 15 to terminal of motor $3^a$, thence through lead $3^b$ and winding $K'_3$ to junction 4, thence through winding $K''_3$ to junction 1. Also from supply-conductor 13 circuit can be traced through contact O, contact D, conductor 22, contact H, contact P, and conductor 14 to terminal of motor $7^a$, thence through lead $7^b$ and winding $K'_1$ to junction 2, thence through winding $K''_1$ to junction 1. It will be observed that the winding for each phase is divided into two equal parts which in the position of the controller for which we have just traced the circuits are in series in each case and the windings of the phases connected in Y across the supply-conductors. Reference to Fig. 15 will show that in this position of the controller alternate north and south poles, as indicated by N and S, are formed. In the next and last position of the controller contacts D D' D'' are on line 17 17, contacts H H'' lie along line 18 18, and I lies on line 19 19. Circuits can now be traced from supply-conductor 11 to contact O'', thence through contact H'', conductor 24, contact D'', contact Q'', conductor 10, motor-terminal $6^a$, and lead $6^b$ to junction 6. Here the circuit divides, one path leading through winding $K'_2$, lead $5^b$, motor-terminal $5^a$, conductor 16, and contact P'' to I, the other path leading through winding $K''_2$ to junction 1. From supply-conductor 12 we may trace a circuit through contact O', contact H', conductor 23, contact D', contact Q', conductor 9, motor-terminal $4^a$, lead $4^b$ to junction 4, where the circuit divides, one path leading through winding $K''_3$ to junction 1 and the other through winding $K'_3$, lead $3^b$, motor-terminal $3^a$, conductor 15, and contact P' to I. From the supply-conductor 13 circuit can be traced through contact O, contact H, conductor 22, contact D, contact Q, conductor 8, motor-terminal $2^a$, and lead $2^b$ to junction 2, where the circuit divides, one path leading through winding $K''_1$ to junction 1 and the other through winding $K'_1$, conductor $7^b$, motor-terminal $7^a$, conductor 14, and contact P to I. The windings $K'_1$, $K'_2$, and $K'_3$, each of which constitutes one half of the winding of one phase, are now connected in Y across the supply-conductors, the junction being in contact I and the other halves of the winding $K''_1$, $K''_2$, and $K''_3$ are also connected across the supply-conductor, but are joined at junction 1. Fig. 16 illustrates the connections as now established and the relative directions of current in the windings. Two poles, as indicated by N' and S', are formed in this last position of the controller as against four poles in the first operative position, and a corresponding change in the operation of the motor is effected. The apparatus is not, however, limited to the control of a motor having the numbers of poles, as stated; but may be extended to include that of a motor of any practicable number of poles.

The controller I have invented is applicable to numerous multiphase windings and many of the details of construction have a wide application in the controller art. I do not, therefore, wish to be limited to the apparatus shown in the drawings.

What I claim as new, and desire to secure by Letters Patent of the United States, is—

1. The combination of multiphase windings, a plurality of terminals for each of said windings, a fixed contact for each of said terminals, multiphase supply-conductors, a fixed contact connected to each supply-conductor, movable contacts constructed and arranged to connect the supply-contacts with either set of winding-terminal contacts.

2. The combination of multiphase windings, a plurality of terminals for each of said windings, a fixed contact for each of said terminals, multiphase supply-conductors, a fixed contact connected to each supply-conductor, movable contacts constructed and arranged to connect the supply-contacts with one set of winding-terminal contacts and connect the other set of said winding-terminal contacts together.

3. The combination of multiphase windings, multiphase supply-conductors, rows of stationary contacts having the contacts of each row connected to the supply-conductors and winding of one phase, rows of movable contacts corresponding to said rows of stationary contacts, each row of said movable contacts movable along and adapted to connect the contacts of a row of said stationary contacts, and other movable contacts adapted to connect contacts lying in a plurality of said rows of stationary contacts.

4. In a switching mechanism, rows of stationary contacts, rows of movable contacts corresponding to said rows of stationary contacts, each row of contacts movable in the plane of its corresponding row of fixed contacts and adapted to connect together stationary contacts lying in the same row, and other movable contacts located so as to move in a plane between adjacent rows of fixed contacts and connect together stationary contacts lying in adjacent rows.

5. In a switching mechanism, rows of stationary contacts, each of said contacts comprising two electrically-connected contact members spaced apart, connected movable contacts adapted to enter the spaces between said contact members whereby stationary contacts in the same row may be connected together, and other movable contacts adapted to pass without said space and contact with the contact members of the stationary contacts in adjacent rows whereby stationary contacts in different rows may be connected together.

6. The combination of multiphase windings connected in Y, multiphase supply-conductors, rows of stationary contacts, each of said rows containing a contact connected to the free end of one of said multiphase windings, a contact connected to the middle point of the same one of said multiphase windings, and a contact connected to one of said supply-conductors, rows of movable contacts having the contacts of one row connected together, said rows of movable contacts movable along said rows of stationary contacts and other movable contacts moving between said rows of stationary contacts, all of said movable contacts occupying definite positions in one of which no connections are made, in another position said supply-conductors are connected to said free ends of windings, and in still another position said supply-conductors are connected to said middle points of windings, and said free ends of windings are connected together.

7. The combination of three-phase motor-windings connected in Y, three-phase supply-conductors, rows of stationary contacts, each of said rows containing a contact connected to the free end of one of said windings, a contact connected to the middle point of the same one of said windings and a contact connected to one of said supply-conductors, rows of movable contacts having the contacts of one row connected together, said row of movable contacts movable along said rows of stationary contacts and other movable contacts moving between said rows of stationary contacts, all of said movable contacts occupying definite positions in one of which no connections are made, in another said supply-conductors are connected to said free ends of windings and in still another position said supply-conductors are connected to said middle points of windings and said free ends of windings are connected together.

8. In a controller, the combination of a casing comprising two semicylindrical headed portions, one of which is provided with an opening to receive conductors, a semicylindrical body of insulating material mounted in one of said portions of the casing, fixed contacts mounted on said insulating-body and coöperating movable contacts mounted on a movable shaft journaled in the heads of the controller-casing.

9. A controller-casing comprising two headed portions, one of which is provided with an opening to receive conductors, a body of insulating material having a concave surface mounted within one of said portions of the controller-casing, fixed contacts mounted on the concave surface of said body of insulating material, and coöperating movable contacts mounted on a movable shaft journaled in the heads of the controller-casing.

10. In a controller, the combination of fixed contacts, each contact comprising a plurality of spring members, movable contacts for engaging the spring members of each of the several fixed contacts, and other movable contacts for connecting the adjacent spring members of different contacts.

11. In a controller, the combination of a row of fixed contacts, each contact comprising two spring members, and a rotatable shaft provided with a plurality of sets of coöperating contacts, the contacts of one set being arranged to engage the two spring members of the several fixed contacts, and the contacts of another set being arranged to connect the adjacent spring members of different contacts.

12. The combination of a plurality of insulating-pieces and a contact coöperating with said insulating-pieces to prevent relative motion.

13. The combination of an insulating-piece having a projection, and another insulating-piece having a projection, said projections coöperating to form a locking-seat for a controller-contact.

14. As an article of manufacture, an insulating-piece having upon one side a projection adapted to coöperate with a similar projection upon another insulating-piece to form a locking-seat for a controller-contact, and having upon the opposite side a similar projection adapted to coöperate with a similar projection upon still another insulating-piece to form a locking-seat for still another controller-contact.

15. As an article of manufacture, an insulating-piece having a projection adapted to coöperate with a similar projection upon another insulating-piece to form a locking-seat for a controller-contact.

16. As an article of manufacture, an insulating-piece having a projection, said projection having a plurality of sides and adapted to coöperate with a similar projection from another insulating-piece to form a polygon as a locking-seat for a controller-contact.

17. As an article of manufacture, a contact-piece for an electric switch composed of two exactly similar parts, said parts having seat portions adapted to fit closely together and offset contact portions, said similar parts being of such conformation as to coöperate with their seat to prevent relative movement thereto.

18. The combination of a shaft, a piece rigidly connected thereto, an insulating-piece on said shaft coöperating with said rigid piece to prevent relative movement, a second piece of insulation coöperating with said first insulating-piece in such manner as to prevent relative movement, a succession of similar insulating-pieces similarly coöperating, seats formed by said insulating-pieces, contact-pieces coöperating with said seats in such manner as to prevent relative motion, a washer adapted to be forced against the last insulating-piece and thereby to secure the said contacts and insulating-pieces rigidly in position.

19. The combination of a controller-casing provided with an entrance for conductors, a curved insulating-shell mounted in said casing and bridging said entrance, and stationary contacts secured to said insulating-shell.

20. As an article of manufacture, an insulating-piece having a projection, said projection coöperating with another projection from another insulating-piece to form a body of other than circular form as a locking-seat for a controller-contact.

In witness whereof I have hereunto set my hand this 26th day of February, 1902.

JOHN BRANDON LINN.

Witnesses:
ALFRED CAVILEER,
W. N. ZURFLUH.